(12) United States Patent
Manfredi

(10) Patent No.: US 11,400,585 B2
(45) Date of Patent: Aug. 2, 2022

(54) ACTUATOR

(71) Applicant: University of Dundee, Dundee (GB)

(72) Inventor: Luigi Manfredi, Dundee (GB)

(73) Assignee: University of Dundee, Dundee (GB)

( * ) Notice: Subject to any disclaimer, the term of this patent is extended or adjusted under 35 U.S.C. 154(b) by 169 days.

(21) Appl. No.: 16/638,881

(22) PCT Filed: Aug. 14, 2018

(86) PCT No.: PCT/GB2018/052305
§ 371 (c)(1),
(2) Date: Feb. 13, 2020

(87) PCT Pub. No.: WO2019/034863
PCT Pub. Date: Feb. 21, 2019

(65) Prior Publication Data
US 2020/0189095 A1 Jun. 18, 2020

(30) Foreign Application Priority Data

Aug. 15, 2017 (GB) ...................................... 1713100
Aug. 25, 2017 (GB) ...................................... 1713725

(51) Int. Cl.
*B25J 9/10* (2006.01)
*B25J 9/00* (2006.01)
(Continued)

(52) U.S. Cl.
CPC ............. *B25J 9/104* (2013.01); *B25J 9/0012* (2013.01); *B25J 15/0233* (2013.01); *F15B 15/02* (2013.01)

(58) Field of Classification Search
CPC ........ B25J 9/104; B25J 15/0233; B25J 9/065; B25J 18/06; B25J 9/0012
See application file for complete search history.

(56) References Cited

U.S. PATENT DOCUMENTS 4,393,728 A * 7/1983 Larson ..................... B25J 18/06
74/469
4,815,782 A 3/1989 Craig et al.
(Continued)

FOREIGN PATENT DOCUMENTS

WO WO 87/01645 A1 3/1987

OTHER PUBLICATIONS

Siciliano, Bruce, et al., Robotics: Modelling, Planning and Control, Advanced Textbooks in Control and Signal Processing, Springer-Verlag London Limited, 2009, *the extended version of: L. Sciavicco, B. Siciliano, and B. Sciavicco, Robotics: Modelling and Control of Robot Manipulators, 2nd ed.* Secaucus, NJ, USA: Springer-Verlag New York, Inc., 2000 as identified in the Series Editors ' Forward.
(Continued)

*Primary Examiner* — Abiy Teka
(74) *Attorney, Agent, or Firm* — Alston & Bird LLP

(57) ABSTRACT

An actuator (1) is described having a first part (4), a second part (2), and a body portion (3) between the first and second parts, wherein the body portion includes at least one chamber (14) configured to be pressurised and the body portion has a longitudinal axis; and a plurality of cables (6,7,8,9), wherein each of the plurality of cables is arranged in a respective at least partial spiral with respect to the longitudinal axis of the body portion (3); and wherein the plurality of cables are arranged such that the application of a selected force to at least one of the cables causes a desired movement of the first part relative to the second part.

20 Claims, 5 Drawing Sheets

(51) Int. Cl.
B25J 15/02 (2006.01)
F15B 15/02 (2006.01)

(56) References Cited

U.S. PATENT DOCUMENTS

| | | | |
|---|---|---|---|
| 2003/0149338 A1 | 8/2003 | Francois et al. | |
| 2012/0165609 A1 | 6/2012 | Liu et al. | |
| 2014/0260755 A1* | 9/2014 | Dong | B25J 9/06 74/490.04 |
| 2015/0141756 A1* | 5/2015 | Cheng | A61B 1/0016 600/146 |
| 2017/0210015 A1* | 7/2017 | Jogasaki | B25J 9/104 |

OTHER PUBLICATIONS

Vanderborght, B., et al., "Variable impedance actuators: A review," Robotics and Autonomous Systems, 2013, vol. 61, No. 12, pp. 1601-1614. [Online]. Available: http://www.sciencedirect.com/science/article/pii/S0921889013001188.

Rus, D., et al., "Design, fabrication and control of soft robots." Nature, May 28, 2015, vol. 521, pp. 467-475, Macmillan Publishers Ltd. [Online]. Available: http://www.nature.com/nature/journal/_v521/n7553/abs/nature14543.html.

Laschi, Cecilia, et al., "Soft Robot Arm Inspired by the Octopus," Advanced Robotics, 2012, vol. 26, No. 7, pp. 709-727. [Online]. Available: http://dx.doi.org/10.1163/156855312X626343.

Mazzolai, B., et al., "Soft-robotic arm inspired by the octopus: II. from artificial requirements to innovative technological solutions," Bioinspiration & Biomimetics, 2012, vol. 7, No. 2, 025005, 14 pages, IOP Publishing. [Online]. Available: http://stacks.iop.org/1748-3190/7/i=2/a=025005.

Cianchetti, M., et al., "Design concept and validation of a robotic arm inspired by the octopus," Materials Science and Engineering C, 2011, vol. 31, No. 6, pp. 1230-1239, Principles and Development of Bio-lnspired Materials. [Online]. Available: http://www.sciencedirect.com/science/article/pii/S0928493110003450.

Hannan, M. W., et al., "The 'elephant trunk' manipulator, design and implementation," in Proceedings of IEEE/ASME International Conference on Advanced Intelligent Mechatronics, Jul. 8-12, 2001, vol. 1, 2001, pp. 14-19, Italy.

Yang, Yunfang, et al., "An elephant-trunk manipulator with twisting flexional rods," in Proceedings of 2015 IEEE International Conference on Robotics and Biomimetics, Dec. 6-9, 2015, pp. 13-18, China.

Rolf, Matthias, et al., "Efficient exploratory learning of inverse kinematics on a bionic elephant trunk," IEEE Transactions on Neural Networks and Learning Systems, Jun. 2014, vol. 25, No. 6, pp. 1147-1160.

Lin, Huai-Tin, et al., "GoQBot: a caterpillar-inspired soft-bodied rolling robot," Bioinspiration & Biomimetics, 2011. vol. 6, No. 2, 026007, 14 pages, IOP Publishing. [Online]. Available: http://stacks.iop.org/1748-3190/6/i=2/a=026007.

Sumbre, Germán, et al., "Octopuses use a human-like strategy to control precise point-to-point arm movements," Current Biology, Apr. 18, 2006, vol. 16, No. 8, pp. 767-772, Elsevier Ltd. [Online]. Available: http://wvvw,sciencedirect com/science/articleipii/S0960982206012747.

Margheri, L., et al., "Soft robotic arm inspired by the octopus: I. From biological functions to artificial requirements," Bioinspiration & Biomimetics, 2012, vol. 7, No. 2, 12 pages, 025004, IOP Publishing. [Online]. Available: http://stacksiop.org/1748-3190/7/i=2/a=025004.

Tondu, Bertrand, "Modelling of the McKibben artificial muscle: A review," Journal of Intelligent Material Systems and Structures, 2012, vol. 23, No. 3, pp. 225-253, Sage Publications. [Online]. Available: http://jim.sagepub.com/content/23/3/225.abstract.

Röthling, Frank, et al., "Platform portable anthropomorphic grasping with the Bielefeld 20-DOF shadow and 9-DOF TUM hand," in Proceedings of IEEE/RSJ International Conference on Intelligent Robots and Systems, Oct. 29-Nov. 2, 2007, pp. 2951-2956, San Diego, California.

Kang, Bong-Soo, "Compliance characteristic and force control of antagonistic actuation by pneumatic artificial muscles," Meccanica, 2014, vol. 49, No. 3, pp. 565-574, Springer.[Online]. Available: http://dx.doi.org/10.1007/s11012-013-9811-y.

Suzumori, Koichi, et al., "Flexible microactuator for miniature robots," in Proceedings of Micro Electro Mechanical Systemson An Investigation of Micro Structures, Sensors, Actuators, Machines and Robots, IEEE, Jan. 1991, pp. 204-209.

Suzumori, Koichi, et al., "Development of flexible microactuator and its applications to robotic mechanisms," in Proceedings of IEEE International Conference on Robotics and Automation, Apr. 1991, pp. 1622-1627 vol. 2., Sacramento, California.

Connolly, Fionnuala, et al., "Mechanical programming of soft actuators by varying fiber angle," Soft Robotics, 2015, vol. 2, No. 1, pp. 26-32, Mary Ann Liebert, Inc.

Intellectual Property Office of the United Kingdom, Search Report for Application No. GB1713725.8, dated Feb. 16, 2018, 4 pages, UK.

The International Bureau of WIPO, International Preliminary Report on Patentability (Chapter 1) for International Application No. PCT/GB2018/052305, dated Feb. 27, 2020, 9 pages, Switzerland.

International Searching Authority, International Search Report and Written Opinion for International Application No. PCT/GB2018/052305, dated Nov. 20, 2018, (10 pages), European Patent Office, Rijswijk, Netherlands.

* cited by examiner

ACTUATOR

CROSS REFERENCE TO RELATED APPLICATIONS

This application is a National Stage Application, filed under 35 U.S.C. 371, of International Application No. PCT/GB2018/052305, filed Aug. 14, 2018, which claims priority to United Kingdom Application No. 1713725.8, filed Aug. 25, 2017, and United Kingdom Application No. 1713100.4, filed Aug. 15, 2017; the contents of all of which are hereby incorporated by reference in their entirety.

BACKGROUND

Related Field

The present invention relates to an actuator and a method of actuating said actuator.

Description of Related Art

During the last decades, roboticists have moved from designing rigid and heavy robots to soft and light ones. The rigidity was one of the requirements, mostly related to high precision and high mechanical bandwidth, essential for some industrial applications. As described by Sciavicco and Siciliano, an industrial robot is defined as a combination of rigid links [1].

Due to the need for safe interaction with humans and to avoid collateral damage, compliant robots were explored using active control and rigid links, or by using materials that are intrinsically compliant [2]. Taking inspiration from nature, a different approach paved the way for so-called soft robotics (SR) [3], based on, for example, the physiology and biomechanics of the octopus [4], [5], [6], the elephant trunk [7], [8], [9], or the caterpillar [10]. Soft materials are adopted to design novel high-compliant actuators and sensors. In sharp contrast to rigid robots, soft robots have a continuous deformable soft structures with high adaptation and agility. They may be composed of material with different stiffness. Bio-inspired control has also been investigated [11], [12].

One of the first pneumatic actuators was reported by McKibben, in the 1950's, proposing a design able to provide a pull-force like human muscles [13]. It consisted of an inner rubber tube with a braided polyester mesh sleeve. This design has been used in antagonistic configuration, obtaining a system able to change its stiffness by controlling the air pressure in each actuator [14], [15].

Differently from this approach, new designs of soft actuators can produce different movements, i.e. pushing, bending or twisting forces. Suzumori et al., at Toshiba Corporation, developed a 3 degrees of freedom (DOFs) pneumatic microactuator composed of three chambers, with an external diameter of 12 mm and total length of 120 mm [16]. The actuator was made from fibre reinforced rubber and actuated by electro-pneumatic or electro-hydraulic systems.

Connoly et al. proposed a mechanical programmable soft actuator by using fibre-reinforcements [18]. A wide range of motion was demonstrated by varying the fibre angle, with 1 DOF of motion: i) extension, ii) bending, iii) twisting, and iv) contracting. Performance was demonstrated by using a simulator and validated by experimentally characterizing the actuators It would be advantageous to increase the number of degrees of freedom exploitable by a single soft actuator, thereby affording a wider range of design choices when constructing soft robotic systems. It would be further advantageous to provide a soft actuator having variable resistance to movement, or stiffness, affording the capability to produce relatively rapid, low precision movements or relatively slower, high precision movements as demanded for a particular application. It would be still further advantageous to provide an actuator having substantially uniform cross-section throughout its range of motion, thereby obviating the well-known "ballooning" and subsequent fatigue problems associated with soft pneumatic actuators.

It is an object of the invention to provide a soft actuator incorporating one or more of the above advantages.

BRIEF SUMMARY

According to a first aspect of the invention there is provided an actuator comprising:
   a first part, a second part, and a body portion between the first and second parts, wherein the body portion includes at least one chamber configured to be pressurised and the body portion has a longitudinal axis; and
   a plurality of cables, wherein each of the plurality of cables is arranged in a respective at least partial spiral with respect to the longitudinal axis of the body portion; and
   wherein the plurality of cables are arranged such that the application of a selected force to at least one of the cables causes a desired movement of the first part relative to the second part.

In operation, a selected force can be applied to at least one of the cables which will cause the first part to move relative to the second part. The selected force may comprise, for example, tensioning the cables, pulling the cables or pushing the cables.

The actuator of the present invention advantageously combines pneumatic and mechanical actuation to provide an actuator with precise movement control.

The plurality of cables arranged in a respective at least partial spiral with respect to the longitudinal of the body portion means that when a selected force is applied to at least one of the cables, the force applied will have an axial component and tangential component. This provides the actuator with the possibility of movement in an additional direction, for example, when compared to an actuator having a plurality of cables arranged substantially parallel to a longitudinal axis of a body portion.

As defined herein, a partial spiral can encompass the cable coiling around the longitudinal axis, maintaining a constant diameter with respect to the longitudinal axis. A partial spiral may also encompass the cable coiling around the longitudinal axis with an increasing or decreasing diameter with respect to the longitudinal axis, for example, the cable may coil around the longitudinal axis in a conical manner.

For example, a cable in at least partial spiral arrangement may comprise a cable that, for at least part of its length, at least partially coils around the longitudinal axis such that for each point along said at least part of its length the cable is at substantially the same distance from the longitudinal axis in a plane perpendicular to the longitudinal axis at that point. Alternatively, a cable in at least partial spiral arrangement may comprise a cable that, for at least part of its length, at least partially coils around the longitudinal axis such that as position along said at least part of its length varies the distance of the cable from the longitudinal axis in a plane perpendicular to the longitudinal axis varies The at least one chamber may be configured such that controlling the pressure of the at least one chamber causes a desired movement of the first part relative to the second part, and/or provides the body portion with a desired rigidity, Such that, a desired movement of the first part relative to the second part may also be achieved by controlling the pressure of the at least one chamber. For example, the chamber may pressurised to a desired pressure such that the first part moves relative to the second part. Or, the chamber may be pressurised to a desired pressure and a selected force may be applied to at least one of the cables such that the first part moves relative to the second part. Or, for example, the pressure of the at least one chamber may be maintained at atmospheric pressure, whilst a selected force is applied to at least one of the plurality of cables to cause a desired movement of the first part relative to the second part.

The plurality of cables may be arranged to maintain their at least partial spiral with respect to the longitudinal axis of the body portion regardless of the orientation of the body portion.

The plurality of cables may be arranged such that at least one of the plurality of cables at least partially spirals in a different direction to at least one other of the plurality of cables. For example, some of the cables may at least partial spiral in a clockwise direction with respect to the longitudinal axis, and some of the cables may at least partial spiral in an anti-clockwise direction with respect to the longitudinal axis. In another example, the actuator may comprise four cables, wherein two cables at least partial spiral in a clockwise direction and two cables at least partial spiral in an anticlockwise direction.

Each of the plurality of cables may subtend a respective arc, wherein the angle of the arc may be between about 20 degrees to 90 degrees, preferably about 60 degrees.

The plurality of cables may be arranged to operate antagonistically to cause movement of the first part relative to the second part. For example, a first selected force may be applied to some of the cables and a second selected force may be applied to the remaining cables such that the first part is moved relative to the second part.

The plurality of cables may be arranged to operate in antagonistic pairs to cause movement of the first part relative to the second part. For example, the actuator may comprise four cables, wherein a first selected force may be applied to two of the cables and a second selected force may be applied to the second two cables.

The plurality of cables may be operatively connected to the first part of the actuator, wherein the application of a selected force to at least one of the cables causes movement of the first part relative to the second part.

The plurality of cables may be operatively connected to the second part of the actuator, wherein the application of a selected force to at least one of the cables causes movement of the first part relative to the second part.

The plurality of cables may be operatively connected to the body portion of the actuator, wherein the application of a selected force to at least one of the cables causes movement of the first part relative to the second part.

In some examples, of the plurality of cables, some may be operatively connected to the first part, some operatively connected to the second part and some operatively connected to the body portion. The skilled person will appreciate that the plurality of cables may be operatively connected in any combination to any of the first part, the second part and the body portion of the actuator in order to cause a desired movement of the first part relative to the second part.

The actuator may comprise a plurality of cable housings, wherein each of the plurality of cables is housed in a cable housing. The cable housings may extend through the first part and/or the second part and/or the body portion of the actuator. The cable housing may be configured to provide the plurality of cables with their respective at least partial spiral, for example, the cable housing may extend through the first part and/or the second part and/or the body portion in an at least partial spiral with respect to the longitudinal axis of the body portion. One or more of the plurality of cables may be housed within a cable housing. The plurality of cables may be free to move within their respective cable housings.

Controlling the pressure of the at least one chamber may comprise increasing the pressure or decreasing the pressure to a selected value. It may also comprise maintaining the pressure of the at least one chamber at atmospheric pressure. Controlling the pressure may also comprise maintaining the pressure of the at least one chamber at a selected pressure.

The ability to control the pressure of the at least one chamber of the actuator may allow the rigidity of the actuator to be adjusted. For example, by pressurising the at least one chamber to a desired pressure, the actuator may be stiffened. This may allow for more precise movement of the first part of the actuator relative to the second part.

The at least one chamber may be positioned within the body portion. This may allow the rigidity of the body portion to be adjusted.

The at least one chamber may be configured to receive a supply of gas.

The actuator may comprise at least two chambers each configured to be pressurised. The at least one chamber may consist of two chambers. This may allow for more accurate control of the rigidity and motion stability of the actuator. The two chambers may be positioned within the body portion. Each chamber may be configured to receive a supply of gas.

The plurality of chambers may be configured such that at least one other of the chambers is pressurisable relative to at least one other of the chambers.

The actuator may further comprise means for controlling the pressure of at least one of the chambers relative to at least one other of the chambers.

The plurality of chambers and the cables may be arranged such that application of desired pressure to at least one of the chambers relative to at least one other of the chambers is such as to at least partially compensate for force applied to, and/or reduce distortion of, part of the actuator due to application of force to the cables.

The pressure in each of the two chambers may be increased to cause translation along the longitudinal axis of the first part relative to the second part and/or to control the rigidity of the actuator.

Each chamber may be pressurised relative to the other to control the rigidity of the actuator. Each chamber may be pressurised relative to the other to cause movement of the first part relative to the second part. For example, the pressure of one chamber may be increased whilst the pressure in the second chamber is decreased or maintained at a selected pressure to cause a bending movement of the first portion relative to the second portion.

The provision of two chambers each configured to be pressurised can allow for increased chamber cross-sectional area compared to the actuator cross sectional area and this may result in a lower chamber activation pressure.

The actuator may further comprise least part of the actuator which comprises an end face or end cap.

The actuator of any preceding claim wherein the body portion comprises an external surface comprises a flexible material. The actuator may be a soft actuator which can allow for safe interaction with the external environment. The flexible material may be elastic. The flexible material may be resilient.

The flexible material may comprise a polymer. For example, the flexible material may be a natural or synthetic rubber, or any suitable synthetic polymer.

The body portion of the actuator may be configured to maintain a substantially constant cross sectional area along the longitudinal axis upon the application of the selected force to at least one of the plurality of cables and/or the pressurisation of the at least one chamber. This configuration can prevent ballooning of the body portion of the actuator when the pressure of the at least one chamber is increased. This in turn may prevent the body portion from suffering from fatigue.

The actuator may comprise at least one reinforcing member configured to be substantially more rigid than the body portion. The provision of a reinforcing member that is substantially more rigid that the body portion may help to maintain the constant cross sectional area of the body portion along the longitudinal axis upon the application of the selected force to at least one of the plurality of cables and/or the pressurisation of the at least one chamber.

The at least one reinforcing member may comprise, for example, a sheath which extends around the body portion.

The at least one reinforcing member may comprise a fibre or a wire, or a plurality of fibres or wires. The fibres or wires may be wrapped around the body portion.

The first part and the second part of the actuator may comprise end portions which are substantially more rigid that the body portion. For example, the end portions may comprise caps, for example rigid polymer caps and/or caps which have been reinforced such that they are substantially rigid.

Rigid end portions facilitate simple connection of one actuator according to the present invention with another. For example, the end portions may be joined together in any suitable way. Additionally, the provision of rigid end portions may allow for additional hardware, for example electronics, to be housed within the end portions without substantially affecting the movement of the actuator.

The actuator may further comprise a hollow member which extends at least through the body portion. The hollow member may be used to house additional actuator hardware, for example, cables or other electronics. The hollow member may also facilitate the connection of actuators according to the present invention.

The actuator of any preceding claim, may be configured such that upon the application of the selected force to at least one of the plurality of cables and controlling the pressure of the at least one chamber, the first part has at least four degrees of freedom with respect to the second part.

The first part may be moved relative to the second part along a z-axis, for example the first part may be translated along the z-axis, wherein the z-axis is substantially parallel to the longitudinal axis of the body. This may be achieved through the application of a selected force to at least one cable and increasing the pressure of the at least one chamber.

The first part may be moved relative to the second part such that the first part rotates relative to the second part about the z-axis by the application of a selected force to at least one of the plurality of cables. For example, a selected force may be applied to at least two of the cables to generate opposing bending moments on the first part, thereby causing rotation of the first part relative to the second part. For example, at least four cables may be arranged such that a selected force may be applied to one pair of cables and another selected force may be applied to the second pair of cables to generate opposing bending moments, thereby causing rotation of the first part relative to the second part.

The first part may be rotated about the z-axis and translated along the z-axis, relative the second part simultaneously.

The first part may be moved relative to the second part such that the first part rotates around a y-axis, by the application of a selected force to at least one the plurality of cables. The y-axis may be considered to be the axis perpendicular to the z-axis. Rotation about the y-axis may be considered to be bending of the first part along a xz plane. For example, a selected force may be applied to at least one of the plurality of cables such that the first part bends in the xz plane relative to the second part. For example, at least four cables may be arranged such that a selected force may be applied to one pair of cables and another selected force may be applied to the second pair of cables to generate a bending moment in the xz plane.

The first part may be moved relative to the second part such that the first part rotates around a x-axis, by the application of a selected force to at least one the plurality of cables. The x-axis may be considered to be the axis orthogonal to the z-axis and the y-axis. Rotation about the x-axis may be considered to be bending of the first part along a yz plane. For example, a selected force may be applied to at least one of the plurality of cables such that the first part bends in the yz plane relative to the second part. For example, at least four cables may be arranged such that a selected force may be applied to one pair of cables and another selected force may be applied to the second pair of cables to generate a bending moment in the yz plane.

Actuators of the present invention may be of different shapes and sizes depending on the duty required.

The actuator of the present invention may have an external dimension, for example, an external diameter, of a few millimetres, for example 5 mm to 30 mm. Such an actuator may have particular application in medical applications, for example in devices for minimal access surgery, and for use in endoscopes.

The actuator of the present invention may have an external dimension, for example, an external diameter of up to several centimetres, for example up to 10 cm, 20 cm or 30 cm, or any appropriate size for a desired use of the actuator. Such an actuator may have particular use in industrial applications.

The actuator of the present invention may be produced as a single component, or, may be produced as multiple components which are joined together, for example by any suitable adhesive or bonding, such as fusion bonding. The actuator of the present invention may be 3D printed.

According to another aspect of the present invention there is provided a snake-like robot comprising at least one actuator as described by the appended claims.

According to a further embodiment of the present invention, there is provided a snake like robot comprising a plurality of actuators as claimed herein, connected together.

The plurality of actuators may be connected in series.

Each of the plurality of actuators in the snake like robot may be independently actuatable. For example, the first part of one actuator may be moved relatively to the second part of the actuator in one direction by the application of a selected force to at least one of the cables of the first actuator, whilst the first part of a second actuator may be moved relative to the second part of the second actuator in another direction by application of a selected force to at least one of the cables of the second actuator, simultaneously.

A first part of a first actuator may be connected to a second part of a second actuator such moving the first part of the first actuator also causes movement of the second part of the second actuator. Any number of actuators may be connected together in this manner.

The actuators may be connected by any suitable bonding process, for example by any suitable adhesive. Alternatively, the actuators may be connected using link pieces. The link pieces may be pivotally or rigidly connected to the actuators.

According to a further aspect of the present invention, an actuator apparatus is described comprising
 at least one actuator according to any of the appended claims;
 means for applying pressure to the at least one chamber;
 means for applying force to each of the cables;
 a controller for controlling the pressure or pressures applied to the at least one chamber and the force or forces applied to the cables thereby to obtain a desired movement of the first part of the actuator relative to the second part of the actuator and/or to provide a desired rigidity of the actuator.

A further aspect of the present invention is directed to a method of actuating an actuator is also described, the method comprising
 applying a selected force to at least one of plurality of cables which are arranged in respective at least partial spiral with respect to a longitudinal axis of a body portion of an actuator to cause a desired movement of a first part of the actuator relative to a second part of the actuator, wherein the actuator comprises at least one chamber configured to be pressurised.

The method may further comprise controlling the pressure of at least one chamber such as to adjust the rigidity of the actuator.

The method may further comprise controlling the pressure of the at least one chamber such as to cause a desired movement of the first part of the actuator relative to the second part of the actuator.

The actuator may be an actuator according to an embodiment of the present invention.

The method may comprise connecting a plurality of actuators together, for example connecting a plurality of actuators together in series.

It should be understood that the features defined in accordance with any of the aspects of the present invention or below in relation to any specific embodiment of the invention may be utilised, either alone or in combination with any other defined feature, in any other aspect of the invention.

BRIEF DESCRIPTION OF THE FIGURES

These and other aspects of the present invention will now be described, by way of example only, with reference to the accompanying drawings, in which.

DETAILED DESCRIPTION OF VARIOUS EMBODIMENTS

Figure 1:
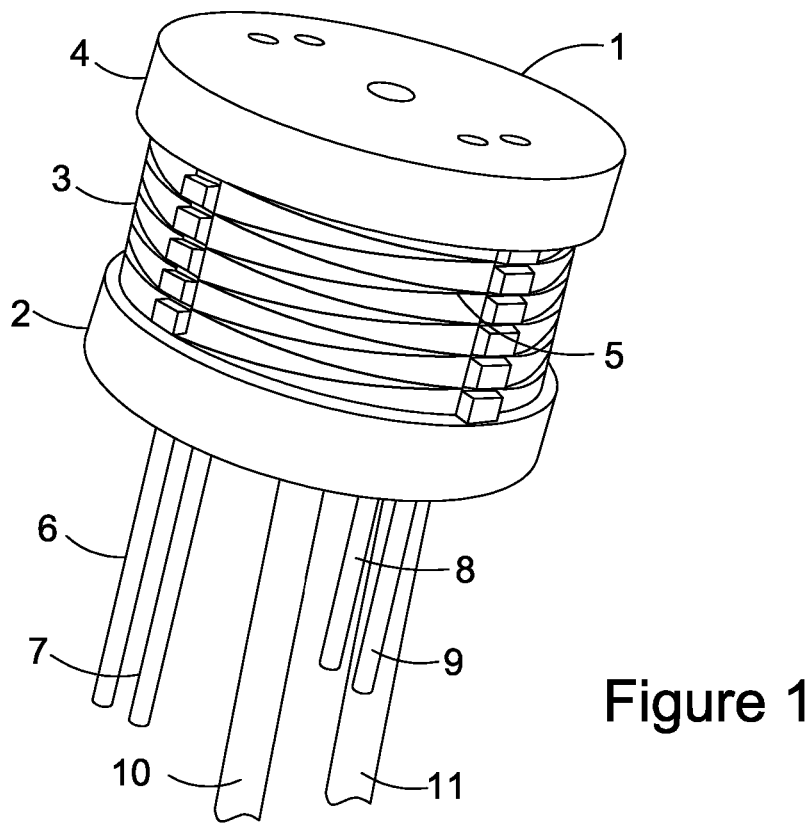
FIG. 1 shows an external view of an actuator according to an embodiment of the present invention, in isometric projection.

Turning to FIG. 1, the invented actuator 1 comprises a base 2 and a distal cap 4 connected by a flexible and expandable cylindrical wall, surrounded by cylindrical sheath 3. Both wall and sheath are constructed from a soft, elastic and resilient material, for example natural or synthetic rubbers or a suitable polymeric material. Sheath 3 may include reinforcement 5, which for example, may comprise two helically wound wire reinforcements, the two helices having opposed handedness. As will be described in greater detail below, the actuator is controlled by cables or wires, 6, 7, 8 and 9, and air supply tubes 10 and 11.

Figure 2:
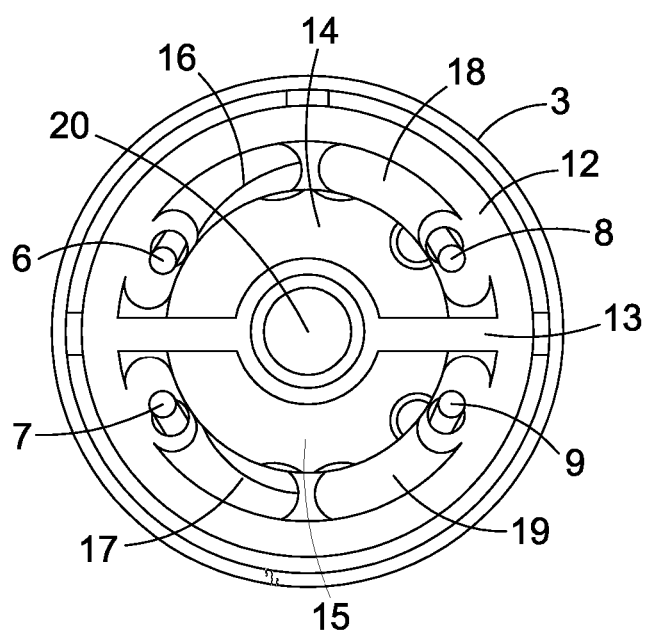
FIG. 2 shows transverse cross sections views of the actuator of FIG. 1.

FIG. 2 shows a transverse cross section through the actuator. Sheath 3, surrounds cylindrical wall 12, which is divided by partition 13 into two chambers 14 and 15. Partition 13 comprises a central hollow cylinder 20. Each chamber 14 and 15 incorporates a pair of helical sub-chambers 16, 17, 18 and 19. Each sub-chamber extends up the length of its corresponding main chamber, whilst sub-tending an arc of approximately 60 degrees. Cylindrical wall 12, partition 13 and optionally, sub-chambers 16 to 19 may be produced as a single component by a suitable moulding process or by an additive manufacturing process, for example so-called 3D printing. Alternatively, sub-chambers 16 to 19 may be manufactured as separate components and joined to chambers 14 and 15 by adhesive or fusion bonding.

Figure 3:
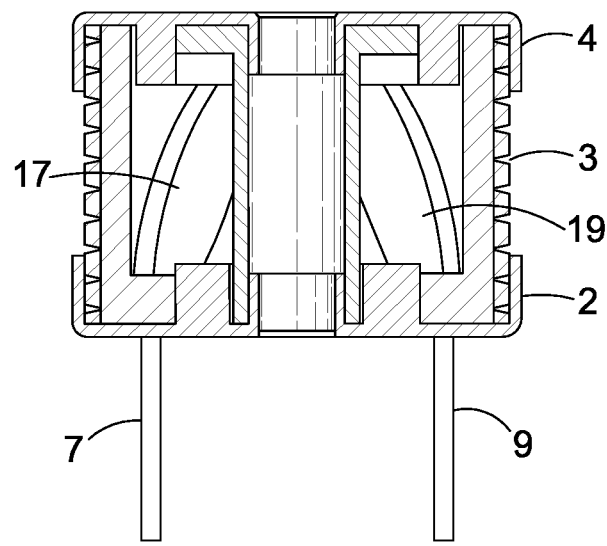
FIG. 3 shows a longitudinal cross sectional view of the actuator of FIG. 1.
Figure 4:
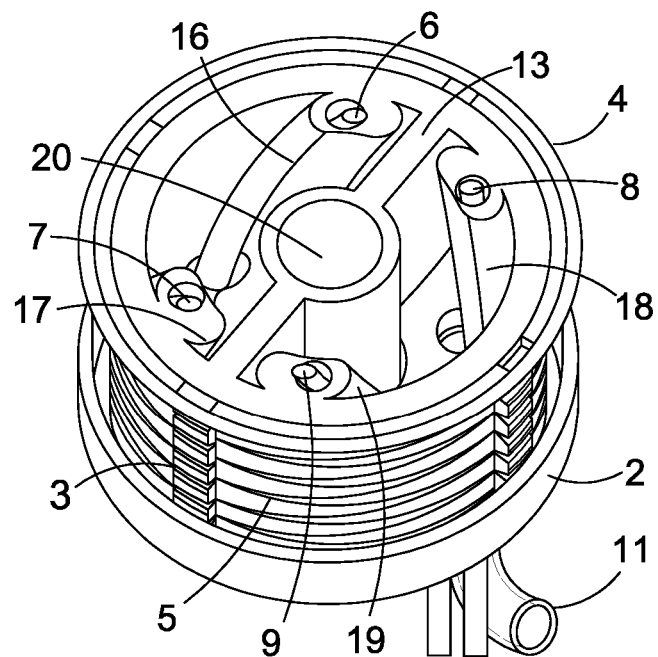
FIG. 4 shows an internal view of the actuator of FIG. 1, in isometric projection.

As illustrated in FIGS. 3 and 4, each of cables 6, 7, 8 and 9 passes through an aperture in base 2, through one of sub-chambers 16, 17, 18 and 19, and is secured at its distal end to distal cap 4. The cables may comprise a Bowden cable or similar, comprising a wire core 6, 7, 8 and 9 and a sheath. Air/gas supply tubes 10 and 11 form a fluid connection with chambers 14 and 15 respectively, through base 2. As will be appreciated, in use, air supply tubes 10 and 11 are connected to a source of compressed air/gas (not shown), allowing the pressure within chambers 14 and 15 to be independently controlled.

Figure 5:
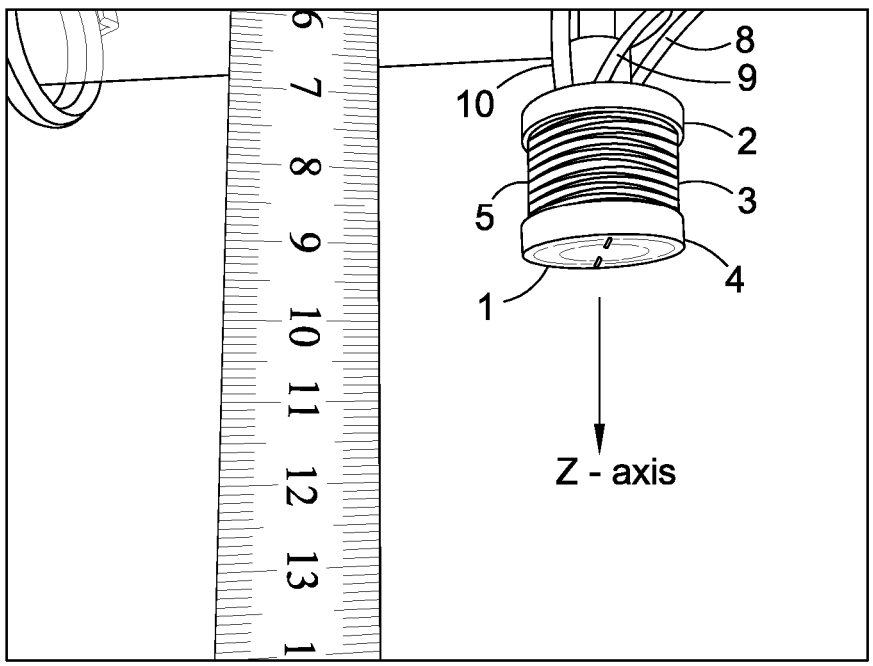
FIG. 5 shows an actuator according to the present invention in neutral position.

Three axis, four degrees of freedom control of the actuator will now be described. For convenience, the z axis is defined as the long axis of actuator 1 and may be envisaged as a line passing through central hollow cylinder 20 from base 2 to distal cap 4. The y axis is defined by a line orthogonal to the z axis, passing through partition 13. The x axis is orthogonal to both y and z axes. The neutral point of the actuator about each axis is defined as its rest position absent any external pneumatic or mechanical forces, shown in FIG. 5. In FIG. 5, no tension is applied through any of the four cables 6, 7, 8 and 9 and the pressure within both chambers 14 and 15 is at atmospheric pressure.

As will be apparent to the skilled reader, the actuator is capable of rotating distal cap 4 about any of x, y or z axes relative to base 2 and, in addition capable of translating distal cap 4 along the z axis relative to base 2. In this context, rotation about the y axis can be defined as bending in the xz plane and rotation about the x axis can be defined as bending in the yz plane. Referring to FIG. 4, the yz plane may be defined as the plane coincident with the partition 13 defining the two chambers 14 and 15.

Pneumatic Control

Figure 6:
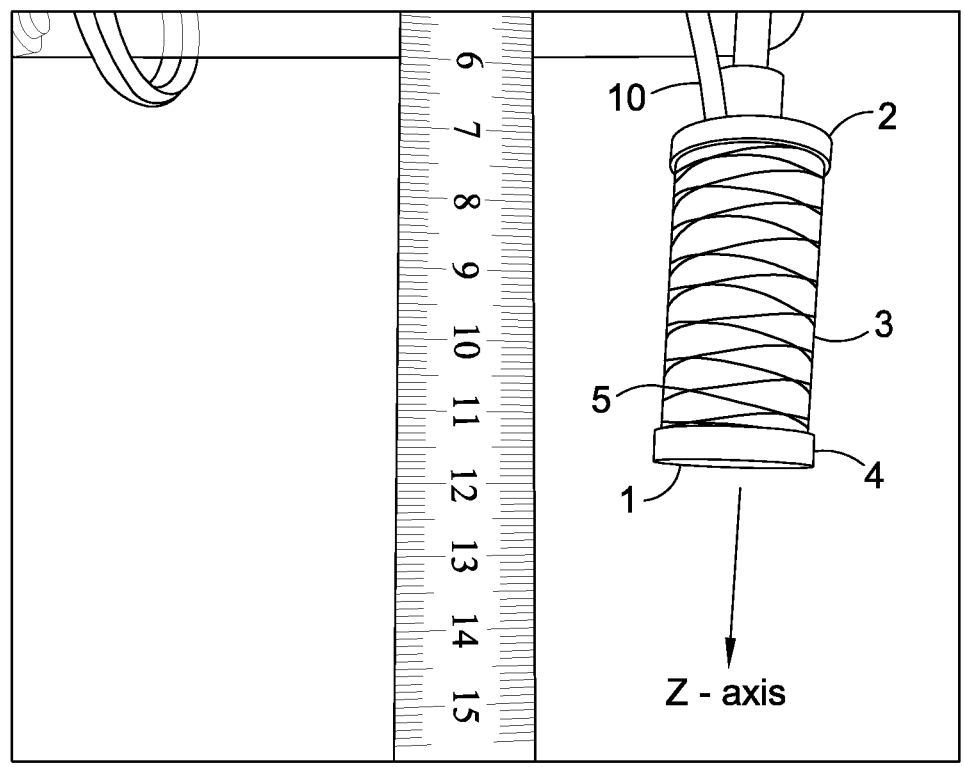
FIG. 6 shows an actuator according to the present invention extended along the z-axis.

Extension of the actuator away from its neutral point long the z axis is shown in FIG. 6 and may be accomplished by increasing the air/gas pressure in both of chambers 14 and 15 simultaneously, while the force applied to the cables 6, 7, 8 and 9 may be reduced. Conversely, retraction may be accomplished by releasing the pressure in both chambers 14 and 15, whereupon the elastic construction of the actuator 1 will ensure it returns to a neutral position, while the force applied to the cables 6, 7, 8 and 9 may be increased. Retraction to and beyond the neutral point may be achieved by further reducing the pressure in chambers 14 and 15, thereby creating a partial vacuum therein.

As shown in FIG. 6, when the air pressure in both chambers 14 and 15 is increased simultaneously, the actuator 1 side walls are distended but the wire reinforced 5 outer sheath 3 ensures that the actuator diameter remains constant. In particular, the side walls do not expand beyond the two end caps 2, 4.

Rotation about the y axis (bending in the xz plane) may be accomplished by inflating and/or deflating chambers 14 and 15 as an antagonistic pair. Inflating chamber 13 with chamber 14 either at atmospheric pressure or under vacuum will generate a torque in one direction. Inflating chamber 14 and leaving chamber 13 at atmospheric pressure or under vacuum, will generate a torque in the opposite direction.

Mechanical Control

Referring to FIGS. 1 and 4, cables 6, 7, 8 and 9 are housed respectively within sub-chambers 16, 17, 18 and 19 and may be operated in antagonistic pairs to drive rotation about any desired axis or combination of axes, according to the following scheme:

| Movement | Activation |
|---|---|
| Rotation about y axis (bending in xz plane) | Cables 6 and 8 paired against cables 7 and 9 |
| Rotation about x axis (bending in yz plane) | Cables 6 and 7 paired against cables 8 and 9 |
| Rotation about z axis | Cables 7 and 8 paired against cables 6 and 9 |

Figure 7:
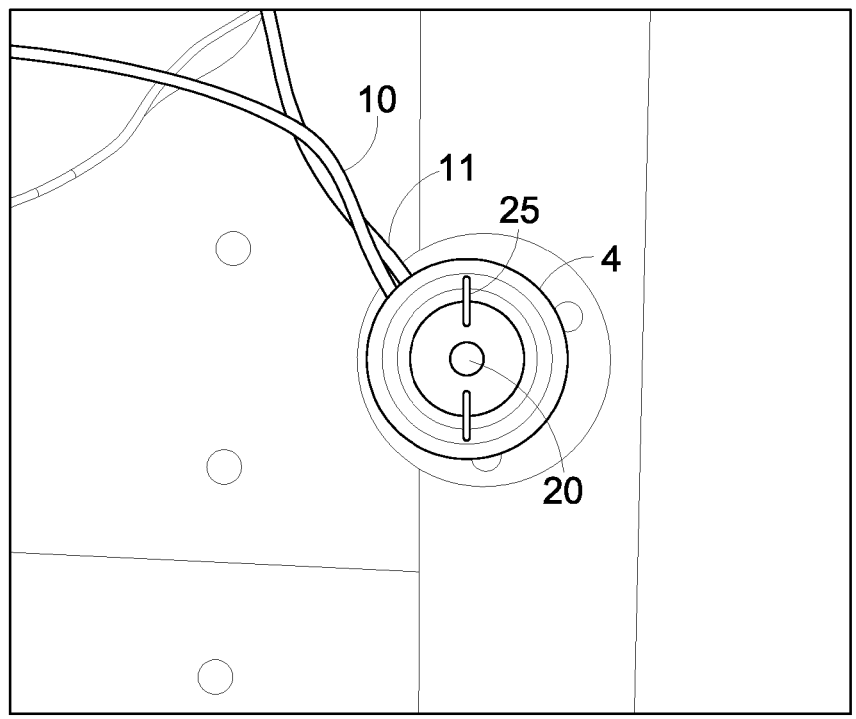
FIG. 7 shows a plan view of an actuator according to the present invention in a neutral position.
Figure 8:
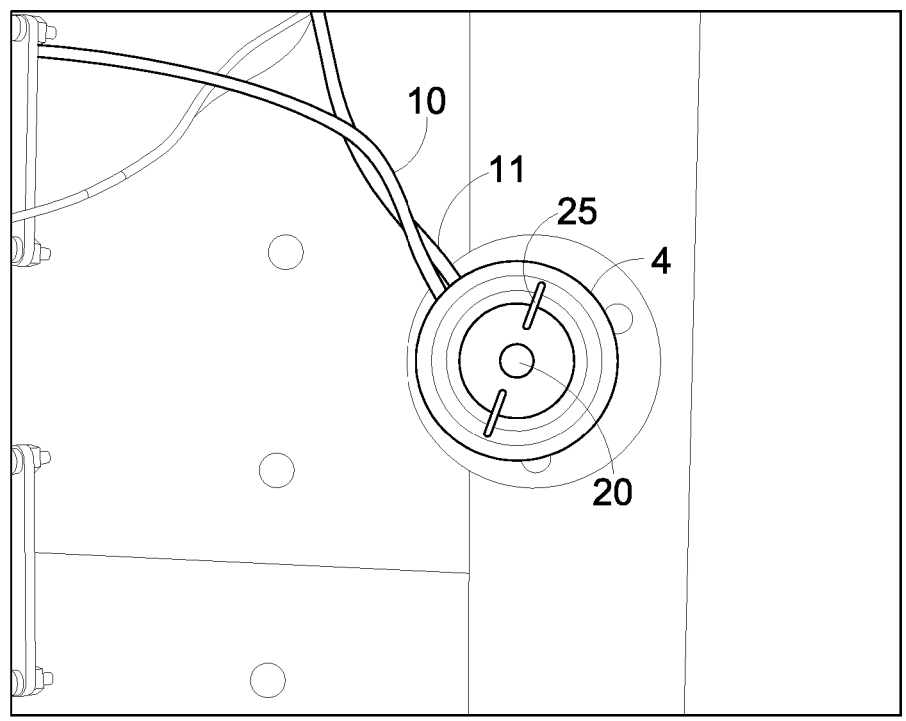
FIG. 8 shows a plan view of an actuator according to the present invention with one end rotated relative to the other.

FIGS. 7 and 8 show rotation of the actuator about the z axis. The actuator is rotated from the neutral position of FIG. 7 clockwise by applying tension to cables 7 and 8. Markings 25 in FIG. 6 are rotated clockwise in FIG. 7 highlighting the clockwise rotation of end cap 4. In order to achieve anti-clockwise rotation, cables 7 and 8 are relaxed whilst tension is applied to cables 6 and 9.

The force applied by tensioning any one of cables 6, 7, 8 and 9 will have an axial component (along the z axis) and a tangential component because of the helical path of the cables 6, 7, 8, 9 within sub chambers 16, 17, 18 and 19. As such, when commanding the actuator 1 to perform a rotation about the z axis as shown in FIG. 7, in order to achieve balanced rotation (i.e. with no bending), the cables have to be operated in pairs such that the force applied to each pair, for example cables 7 and 8 and cables 6 and 9, will generate opposite bending moments to prevent the actuator bending. Further, in the absence of any countering force applied through the chambers 14 and 15, application of tension to the cables as described will cause the actuator to both rotate around the z axis and translate along the z axis.

As will be appreciated, simultaneous rotation about a plurality of axes may be achieved by combining the above combinations of cable activations and varying the pulling force applied by each cable.

Retraction along the z axis may be achieved by applying an equal pulling force on all four cables 6, 7, 8, and 9 simultaneously.

Figure 9:
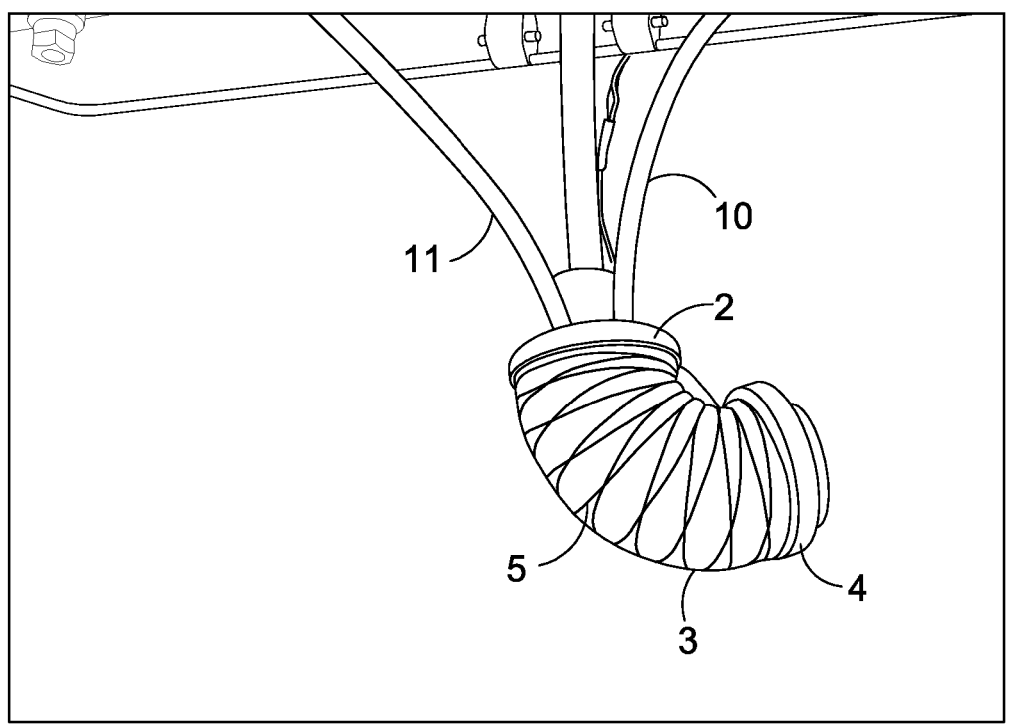
FIG. 9 shows a side view of an actuator according to the present invention executing a bending movement.

Referring to FIG. 9, the actuator 1 is shown executing a bending movement in the yz plane. This bending is achieved by operating cables 6 and 7 antagonistically with cables 8 and 9.

Similarly, but not shown, bending of the actuator in the xz plane can be executed by operating cables 6 and 8 antagonistically with cables 7 and 9.

Actuator stiffness, that is, its resistance to movement may be controlled by varying the pressure in chambers 13 and 14, while increasing the force applied to cables 6, 7, 8 and 9. Increasing the chamber pressure together with cable forces, will increase the actuator stiffness and vice-versa. As will be appreciated, chamber inflation will be constrained longitudinally (along the z axis) by cables 6, 7, 8 and 9, and laterally (along the x or y axes) by sheath 3 and sheath reinforcement 5. The force required to bend the actuator such that it subtends a desired angle will depend on the actuator stiffness.

Typically, chambers 13 and 14 are at least partially inflated whilst the actuator is in use. Experiments by the inventor have found that partial inflation is required to provide optimum positioning control.

The skilled person will appreciate that the pneumatic and mechanical control schemes described above may be used individually or in concert in order to effect the desired actuator motion.

REFERENCES

[1] L. Sciavicco, B. Siciliano, and B. Sciavicco, *Modelling and Control of Robot Manipulators*, 2nd ed. Secaucus, N.J., USA: Springer-Verlag New York, Inc., 2000.

[2] B. Vanderborght, A. Albu-Schaeffer, A. Bicchi, E. Burdet, D. Caldwell, R. Carloni, M. Catalano, O. Eiberger, W. Friedl, G. Ganesh, M. Garabini, M. Grebenstein, G. Grioli, S. Haddadin, H. Hoppner, A. Jafari, M. Laffranchi, D. Lefeber, F. Petit, S. Stramigioli, N. Tsagarakis, M. V. Damme, R. V. Ham, L. Visser, and S. Wolf, "Variable impedance actuators: A review," *Robotics and Autonomous Systems*, vol. 61, no. 12, pp. 1601-1614, 2013. [Online]. Available: http://www.sciencedirect.com/science/article/pii/S0921889013001188

[3] D. Rus and M. T. & Tolley, "Design, fabrication and control of soft robots." Nature, vol. 521, pp. 467-475, 2015. [Online]. Available: http://www.nature.com/nature/journal/v521/n7553/abs/nature14543.html

[4] C. Laschi, M. Cianchetti, B. Mazzolai, L. Margheri, M. Follador, and P. Dario, "Soft robot arm inspired by the octopus," *Advanced Robotics*, vol. 26, no. 7, pp. 709-727, 2012. [Online]. Available: http://dx.doi.org/10.1163/156855312X626343

[5] B. Mazzolai, L. Margheri, M. Cianchetti, P. Dario, and C. Laschi, "Soft-robotic arm inspired by the octopus: Ii. from artificial requirements to innovative technological solutions," *Bioinspiration & Biomimetics*, vol. 7, no. 2, p. 025005, 2012. [Online]. Available: http://stacks.iop.org/1748-3190/7/i=2/a=025005

[6] M. Cianchetti, A. Arienti, M. Follador, B. Mazzolai, P. Dario, and C. Laschi, "Design concept and validation of a robotic arm inspired by the octopus," *Materials Science* and Engineering: C, vol. 31, no. 6, pp. 1230-1239, 2011, principles and Development of Bio-Inspired Materials. [Online]. Available: http://www.sciencedirect.com/science/article/pii/S0928493110003450

[7] M. W. Hannan and I. D. Walker, "The 'elephant trunk' manipulator, design and implementation," in *Advanced Intelligent Mechatronics, 2001. Proceedings. 2001 IEEE/ASME International Conference on*, vol. 1, 2001, pp. 14-19 vol. 1.

[8] Y. Yang and W. Zhang, "An elephant-trunk manipulator with twisting flexional rods," in *2015 IEEE International Conference on Robotics and Biomimetics* (ROBIO), December 2015, pp. 13-18.

[9] M. Rolf and J. J. Steil, "Efficient exploratory learning of inverse kinematics on a bionic elephant trunk," *IEEE Transactions on Neural Networks and Learning Systems*, vol. 25, no. 6, pp. 1147-1160, June 2014.

[10] H.-T. Lin, G. G. Leisk, and B. Trimmer, "Goqbot: a caterpillar-inspired soft-bodied rolling robot," *Bioinspiration & Biomimetics*, vol. 6, no. 2, p. 026007, 2011. [Online]. Available: http://stacks.iop.org/1748-3190/6/i=2/a=026007

[11] G. Sumbre, G. Fiorito, T. Flash, and B. Hochner, "Octopuses use a human-like strategy to control precise point-to-point arm movements," *Current Biology*, vol. 16, no. 8, pp. 767-772, 2006. [Online]. Available: http://www.sciencedirect.com/science/article/pii/S0960982206012747

[12] L. Margheri, C. Laschi, and B. Mazzolai, "Soft robotic arm inspired by the octopus: I. from biological functions to artificial requirements," *Bioinspiration & Biomimetics*, vol. 7, no. 2, p. 025004, 2012. [Online]. Available: http://stacks.iop.org/1748-3190/7/i=2/a=025004

[13] B. Tondu, "Modelling of the McKibben artificial muscle: A review," *Journal of Intelligent Material Systems and Structures*, vol. 23, no. 3, pp. 225-253, 2012. [Online]. Available: http://jim.sagepub.com/content/23/3/225.abstract

[14] F. Rothling, R. Haschke, J. J. Steil, and H. Ritter, "Platform portable anthropomorphic grasping with the bielefeld 20-dof shadow and 9-dof tum hand," in *2007 IEEE/RSJ International Conference on Intelligent Robots and Systems*, October 2007, pp. 2951-2956.

[15] B.-S. Kang, "Compliance characteristic and force control of antagonistic actuation by pneumatic artificial muscles," *Meccanica*, vol. 49, no. 3, pp. 565-574, 2014. [Online]. Available: http://dx.doi.org/10.1007/s11012-013-9811-y

[16] K. Suzumori, S. Iikura, and H. Tanaka, "Flexible microactuator for miniature robots," in *Micro Electro Mechanical Systems, 1991, MEMS '91, Proceedings. An Investigation of Micro Structures, Sensors, Actuators, Machines and Robots. IEEE*, January 1991, pp. 204-209.

[17], "Development of flexible microactuator and its applications to robotic mechanisms," in *Robotics and Automation, 1991. Proceedings., 1991 IEEE International Conference on*, April 1991, pp. 1622-1627 vol. 2.

[18] F. Connolly, P. Polygerinos, C. J. Walsh, and K. Bertoldi, "Mechanical programming of soft actuators by varying fiber angle," *Soft Robotics*, vol. 2, pp. 26-32, 2015.

The invention claimed is:

1. An actuator comprising:
 a first part, a second part, and a body portion between the first and second parts, wherein the body portion includes at least one chamber configured to be pressurised and the body portion has a longitudinal axis; and
 a plurality of cables, wherein each of the plurality of cables is arranged in a respective at least partial spiral with respect to the longitudinal axis of the body portion; and
 wherein the plurality of cables are arranged such that the application of a selected force to at least one of the cables causes a desired movement of the first part relative to the second part;
 wherein the at least one chamber is configured to be pressurized by a supply of gas and wherein the body portion is configured to maintain a substantially constant cross sectional area along the longitudinal axis upon the application of the selected force to at least one of the plurality of cables and/or the pressurisation of the at least one chamber.

2. The actuator of claim 1, wherein the at least one chamber is configured such that controlling the pressure of the at least one chamber causes a desired movement of the first part relative to the second part, and/or provides the body portion with a desired rigidity.

3. The actuator of claim 1, wherein at least one of the plurality of cables at least partially spirals in a different direction to at least one other of the plurality of cables and/or
 wherein at least one of the plurality of cables at least partially spirals clockwise and at least one other of the plurality of cables at least partially spirals anti-clockwise.

4. The actuator of claim 1, wherein each of the plurality of cables subtend a respective arc of 20 degrees to 90 degrees.

5. The actuator of claim 4, wherein each of the plurality of cables subtend a respective arc of 60 degrees.

6. The actuator of claim 1, wherein the plurality of cables are arranged to operate antagonistically to cause movement of the first part relative to the second part and/or
 wherein the plurality of cables are arranged to operate in antagonistic pairs to cause movement of the first part relative to the second part.

7. The actuator of claim 1, wherein at least one of a), b) or c):
 a) the plurality of cables are operatively connected to the first part;
 b) the plurality of cables are operatively connected to the second part;
 c) the plurality of cables are operatively connected to the body portion.

8. The actuator of claim 1, wherein the actuator comprises at least two chambers each configured to be pressurised.

9. The actuator of claim 8, wherein the plurality of chambers are configured such that at least one other of the chambers is pressurisable relative to at least one other of the chambers.

10. The actuator of claim 9, wherein the plurality of chambers and the cables are arranged such that application of desired pressure to at least one of the chambers relative to at least one other of the chambers is such as to at least partially compensate for force applied to, and/or reduce distortion of, part of the actuator due to application of force to the cables.

11. The actuator of claim 10, wherein said at least part of the actuator comprises an end face or end cap.

12. The actuator of claim 1, wherein the body portion comprises an external surface comprising a flexible material.

13. The actuator of claim 12, wherein the flexible material comprises a polymer.

14. The actuator of claim 1, wherein the actuator comprises at least one reinforcing member configured to be substantially more rigid than the body portion.

15. The actuator of claim 1, wherein the first part and the second part comprise end portions which are substantially more rigid than the body portion and/or
wherein the actuator further comprises a hollow member which extends at least through the body portion and/or
wherein the actuator is configured such that upon the application of the selected force to at least one of the plurality of cables and controlling the pressure of the at least one chamber, the first part has at least four degrees of freedom with respect to the second part.

16. A snake-like robot comprising at least one actuator according to claim 1.

17. A snake-like robot comprising a plurality of actuators according to claim 1, connected together.

18. An actuator apparatus comprising:
at least one actuator according to claim 1; and
a controller for controlling the pressure or pressures applied to the at least one chamber and the force or forces applied to the cables thereby to obtain a desired movement of the first part of the actuator relative to the second part of the actuator and/or to provide a desired rigidity of the actuator.

19. A method of actuating an actuator comprising a first part, a second part, a plurality of cables, and a body portion between the first part and the second part, wherein the body portion has a longitudinal axis and includes at least one chamber configured to be pressurized, wherein the method comprises:
applying a selected force to at least one of the plurality of cables which are arranged in a respective at least partial spiral with respect to the longitudinal axis of the body portion of the actuator to cause a desired movement of the first part of the actuator relative to the second part of the actuator, while maintaining the substantially constant cross sectional area along the longitudinal axis of the body portion.

20. The method of claim 19, wherein the at least one chamber comprises a plurality of chambers, and wherein the method further comprises: controlling the pressure of at least a first chamber of the plurality of chambers relative to at least a second chamber of the plurality of chambers.

* * * * *